United States Patent
Yoneyama

(10) Patent No.: US 6,431,023 B1
(45) Date of Patent: Aug. 13, 2002

(54) LEVER PIVOTING STRUCTURE

(75) Inventor: Hajime Yoneyama, Kanagawa (JP)

(73) Assignee: Ohi Seisakusho Co., Ltd., Yokohama (JP)

( * ) Notice: Subject to any disclaimer, the term of this patent is extended or adjusted under 35 U.S.C. 154(b) by 0 days.

(21) Appl. No.: 09/372,681

(22) Filed: Aug. 12, 1999

(51) Int. Cl.$^7$ ................................ G05G 1/04
(52) U.S. Cl. ................................ 74/519
(58) Field of Search ............. 74/519, 520, 522, 74/522.5; 292/349, 355, 216; 411/508, 913

(56) References Cited

U.S. PATENT DOCUMENTS

| | | | |
|---|---|---|---|
| 4,850,625 A | 7/1989 | Hori et al. | 292/336.3 |
| 4,896,990 A | * 1/1990 | Nakamura et al. | 403/162 |
| 4,902,182 A | * 2/1990 | Lewis | 411/510 |
| 5,186,504 A | 2/1993 | Takaishi et al. | 292/216 |
| 5,765,959 A | 6/1998 | Shioda | 403/199 |
| 6,039,523 A | * 3/2000 | Kraus | 411/48 |

FOREIGN PATENT DOCUMENTS

| | | |
|---|---|---|
| GB | 2134617 | 8/1984 |
| JP | 63-117970 | 7/1988 |

\* cited by examiner

*Primary Examiner*—David A. Bucci
*Assistant Examiner*—Vicky A. Johnson
(74) *Attorney, Agent, or Firm*—Foley & Lardner

(57) ABSTRACT

A lever pivoting structure is mounted on an inner panel of a vehicle door. The structure comprises a first circular opening formed in the inner panel and a shaft member including a body portion, an enlarged flange portion formed on a rear end of the body portion and a stopper head portion formed on a front end of the body portion. The stopper head portion establishes a latched engagement with the first circular opening once the stopper head portion is put into the first circular opening. A pivot lever is formed with a second circular opening through which the body portion of the shaft member passes. The pivot lever has a first surface to which the enlarged flange portion faces and a second surface to which the stopper head portion faces. Resilient stopper tongues are integrally formed on the body portion of the shaft member and extend toward the enlarged flange portion while gradually separating from an axis of said shaft member. Free ends of the resilient stopper tongues abut against the second surface of the pivot lever upon engagement between the shaft member and the pivot lever.

2 Claims, 8 Drawing Sheets

LEVER PIVOTING STRUCTURE

BACKGROUND OF THE INVENTION

1. Field of the Invention

The present invention relates in general to lever pivoting structures for pivotally connecting a lever to a fixed member, and more particularly to lever pivoting structures of a type that pivotally connects an operation lever to an inner panel of an automotive door.

2. Description of the Prior Art

In order to clarify the task of the present invention, one known lever pivoting structure will be described with reference to FIGS. 11 to 13 of the accompanying drawings, which has been employed for transmitting an operative movement of a control knob mounted on an automotive door to a door lock mounted on the door.

In FIG. 11, the lever pivoting structure is designated by reference "LPS". In this drawing, denoted by reference "D" is a side door that is pivotally connected to a body of a motor vehicle for opening and closing a door opening defined in the body. A known door lock 1, such as one disclosed in U.S. Pat. No. 4,850,625, is mounted to a free end of the side door "D", which has a locking/unlocking lever 2 for selectively locking and unlocking a latch lever of the door lock 1. A first transmission rod 3 extends from the locking/unlocking lever 2 to one end of a pivot lever 7 of the lever pivoting structure "LPS" mounted on an inner panel 4 of the door "D". From the other end of the pivot lever 7, there extends a second transmission rod 6 to a control knob 5 that is movably mounted on the inner panel 4 at a position remote from the door lock 1. Thus, when the control knob 5 is pulled in an unlocking direction, that is, leftward for example, the locking/unlocking lever 2 is pivoted in a corresponding direction to unlock the latch lever of the door lock 1. With this, the door "D" becomes ready for opening.

The detail of the lever pivoting structure "LPS" is shown in FIGS. 12 and 13, particularly FIG. 12 that is a sectional view taken along the line XII—XII of FIG. 11.

In FIG. 12, denoted by numeral 8 is a circular opening formed in the inner panel 4, and denoted by numeral 10 is a grommet made of an elastic plastic, which is fitted in the circular opening 8. The grommet 10 comprises a tubular portion 10a, a flange portion 10b formed on a rear end of the tubular portion 10a, and a tapered portion 10c formed on a front end of the tubular portion 10a.

As is seen from FIG. 13, the tapered portion 10c is formed with a plurality of axial slits 10e to provide a plurality of latching pawls (no numerals). The grommet 10 has an annular groove (no numeral) that is defined around the tubular portion 10a between the flange portion 10b and the tapered portion 10c. As is seen from FIG. 12, when the grommet 10 is properly fitted in the circular opening 8, the annular groove of the grommet 10 receives therein a peripheral portion of the opening 8 thereby tightly holding the grommet 10 in the opening 8. The grommet 10 is formed with an axial bore 10d through which a shaft member 11 extending from a pivot lever 7 passes. The pivot lever 7 is formed at a middle portion thereof with a circular opening 9 through which the shaft member 11 passes. The pivot lever 7 has at both ends respective openings (no numerals) with which bent ends of the first and second transmission rods 3 and 6 are pivotally engaged.

As is best seen from FIG. 13, the shaft member 11 comprises a body portion 11a, an enlarged flange portion 11b formed on a rear end of the body portion 11a, a tapered head portion 11c formed on a front end of the body portion 11a, and a neck portion 11d formed between the head portion 11c and the body portion 11a.

For mounting the lever pivoting structure "LPS" to the inner panel 4, the following assembling process is employed.

First, as is seen from FIG. 13, the grommet 10 is pushed at the tapered portion 10c against a periphery of the circular opening 8 of the inner panel 4. With this, the grommet 10 is tightly put in the circular opening 8 having the peripheral portion of the opening 8 received in the annular groove 10a thereof. Then, by using one hand of an assembler, the pivot lever 7 is brought to and pressed against the enlarged flanged portion 10b of the grommet 10 while assuring aligned arrangement between the axial bore 10d of the grommet 10 and the circular opening 9 of the pivot lever 7. Then, with the pivot lever 7 kept pressed against the enlarged flange portion 10b of the grommet 10 by the same hand, the shaft member 11 is put into the opening 9 of the lever 7 and then into the axial bore 10d of the grommet 10 in order by using the other hand. Finally, the shaft member 11 is strongly pushed into the axial bore 10d of the grommet 10, so that the tapered head portion 11c thereof is slipped in the axial bore 10d and projected outward (viz., leftward in FIG. 13) from the split tapered portion 10c of the grommet 10. With these steps, the lever pivoting structure "LPS" is properly assembled on the inner panel 4 of the door "D", as shown in FIG. 12.

However, as will be easily understood from the above description, the lever pivoting structure "LPS" needs a troublesome and time-consumed assembling process. More specifically, the manual work for inserting the shaft member 11 into the opening 9 of the lever 7 and the axial bore 10d of the grommet 10 while keeping the alignment therebetween is very difficult and thus needs a skilled technique, which tends to bring about an increase of costs of the door "D".

SUMMARY OF THE INVENTION

It is therefore an object of the present invention to provide a lever pivoting structure which is free of the above-mentioned drawback.

That is, a main object of the present invention is to provide a lever pivoting structure which can be easily mounted on a panel member.

According to a first aspect of the present invention, there is provided a lever pivoting structure mounted on a panel member, which comprises a first circular opening formed in the panel member; a shaft member including a body portion, an enlarged flange portion formed on a rear end of the body portion and a stopper head portion formed on a front end of the body portion, the stopper head portion establishing a latched engagement between the stopper head portion and the first circular opening once the stopper head portion is put into the first circular opening; a pivot lever formed with a second circular opening through which the body portion of the shaft member passes, the pivot lever having a first surface to which the enlarged flange portion faces and a second surface to which the stopper head portion faces; and at least one resilient stopper tongue integrally formed on the body portion of the shaft member, the resilient stopper tongue extending toward the enlarged flange portion while gradually separating from an axis of the shaft member, a free end of the resilient stopper tongue abutting against the second surface of the pivot lever upon engagement between the shaft member and the pivot lever.

According to a second aspect of the present invention, there is provided a lever pivoting structure mounted on a panel member, which comprises a first circular opening formed in the panel member; a resilient grommet put in the first circular opening to achieve a latched engagement therebetween, the grommet having an axial bore formed therethrough; a shaft member including a body portion, an enlarged flange portion formed on a rear end of the body portion and a stopper head portion formed on a front end of the body portion, the stopper head portion establishing a latched engagement between them stopper head portion and the grommet once the stopper head portion is put into the axial bore of the grommet; a pivot lever formed with a second circular opening through which the body portion of the shaft member passes, the pivot lever having a first surface to which the enlarged flange portion faces and a second surface to which the stopper head portion faces; and resilient stopper tongues integrally formed on the body portion of the shaft member and extending toward the enlarged flange portion while gradually separating from an axis of the shaft member, free ends of the resilient stopper tongues abutting against the second surface of the pivot lever upon engagement between the shaft member and the pivot lever.

BRIEF DESCRIPTION OF THE DRAWINGS

Other objects and advantages of the present invention will become apparent from the following description when taken in conjunction with the accompanying drawings, in which.

DETAILED DESCRIPTION OF THE EMBODIMENTS

Referring to FIGS. 1 to 5, there is shown a lever pivoting structure 100 which is a first embodiment of the present invention.

Figure 11:
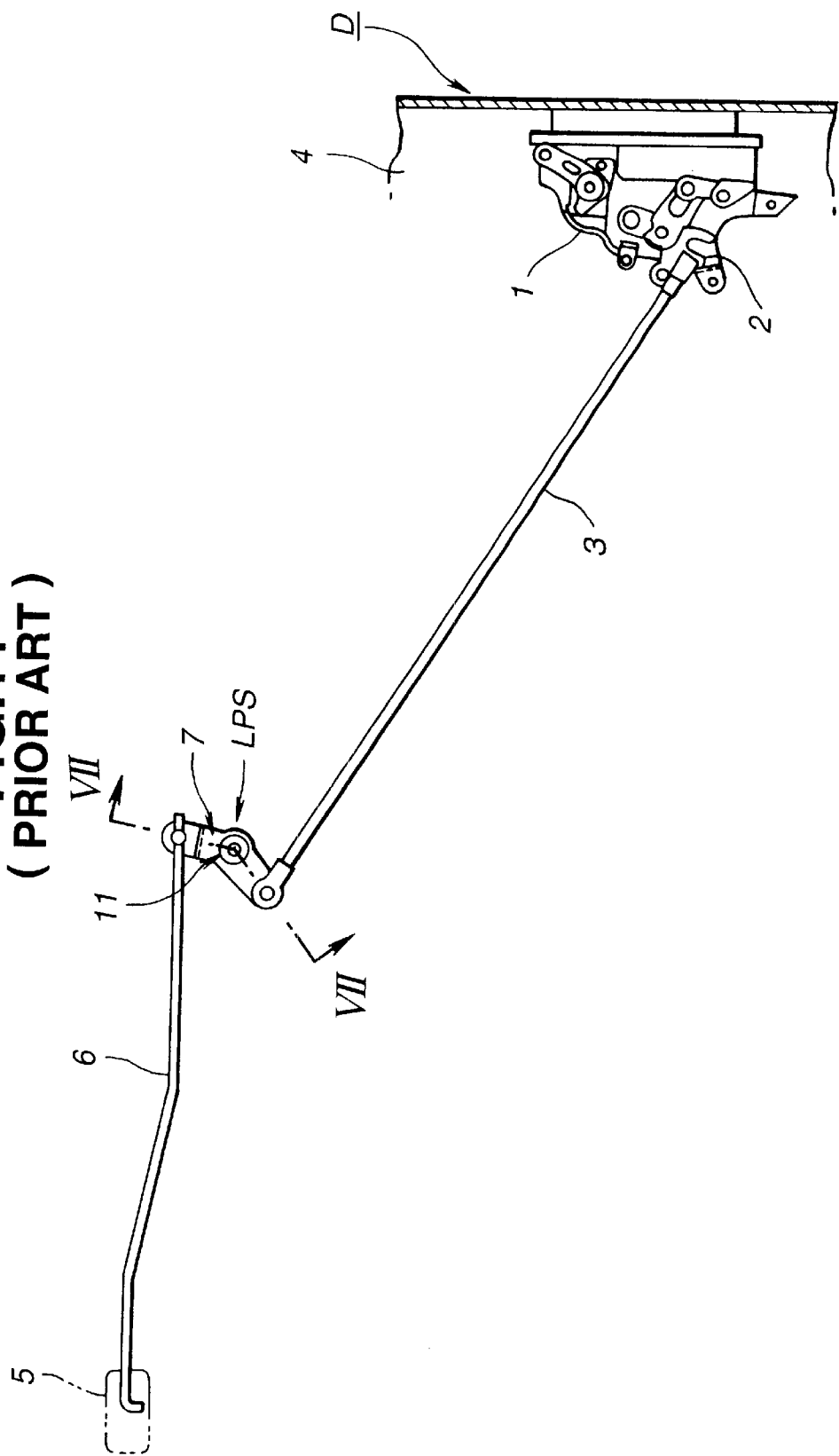
FIG. 11 is a view similar to FIG. 6, but showing a door lock/unlock system to which a known lever pivoting structure is practically applied.
Figure 12:
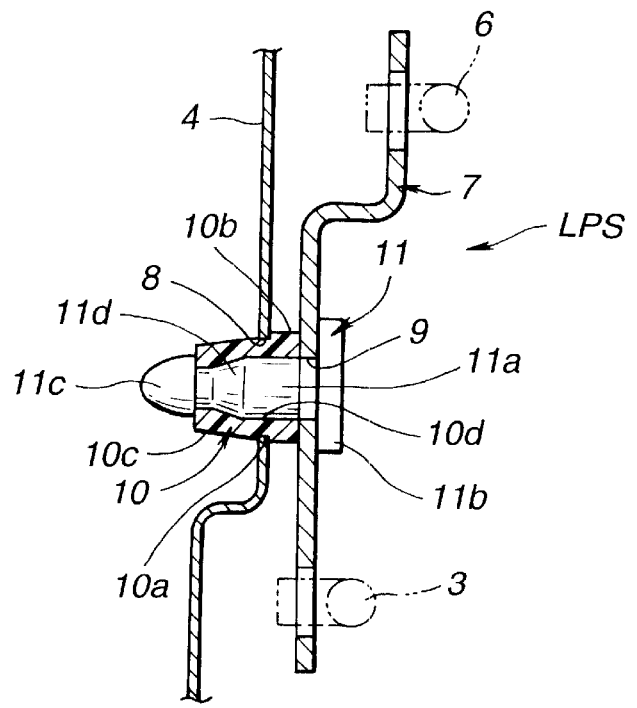
FIG. 12 is a sectional view of the known lever pivoting structure in an assembled condition.
Figure 13:
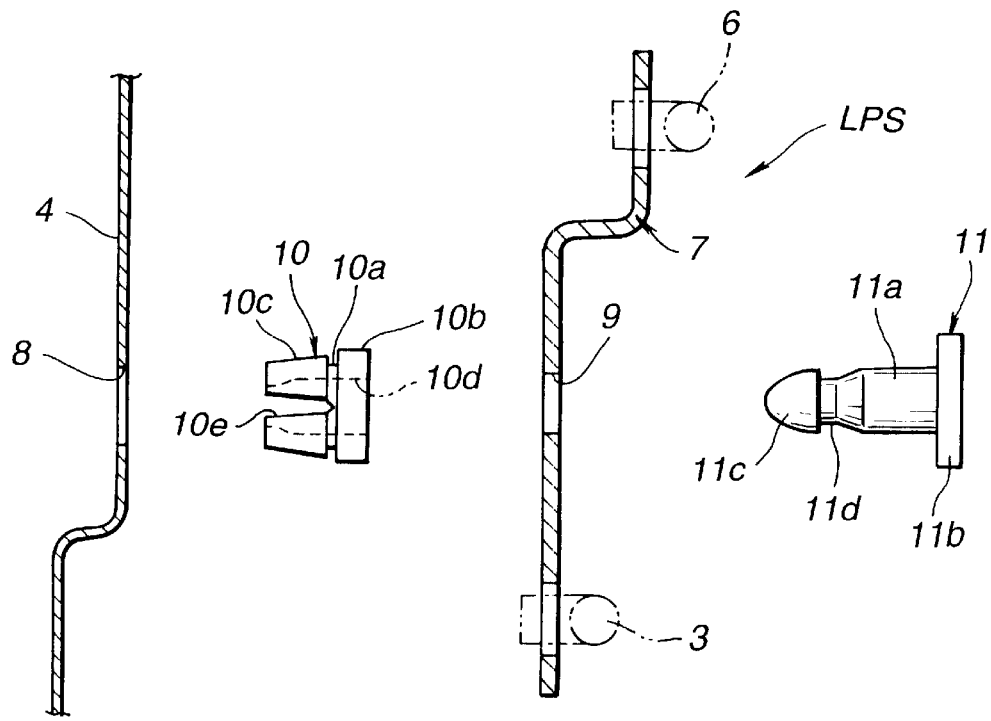
FIG. 13 is a sectional view of the known lever pivoting structure in an unassembled condition.

In the following description, parts and structures similar to those of the above-mentioned known lever pivoting structure of FIGS. 11 to 13 are denoted by the same numerals as those of the known one.

A shaft member 11 employed in this first embodiment 100 is constructed of an elastic plastic. Similar to the shaft member 11 employed in the above-mentioned known lever pivoting structure, the shaft member 11 generally comprises a body portion 11a, an enlarged flange portion 11b formed on a rear end of the body portion 11a, a tapered head portion 11c formed on a front end of the body portion 11a, and a neck portion 11d formed between the head portion 11c and the body portion 11a.

In this first embodiment 100, the shaft member 11 further comprises a pair of flat-bottomed recesses 11e and 11e which are formed at diametrically opposed sections of the body portion 11a, and a pair of resilient stopper tongues 11f and 11f which extend from front ends of the recesses 11e and 11e toward the enlarged flange portion 11b while gradually separating from an axis of the shaft member 11, as shown. It is to be noted that the tongues 11f and 11f are integral with the body portion 11a. Under a non-stressed condition, the free end of each tongue 11f extends radially outward beyond the outer surface of the body portion 11a.

Figure 4:
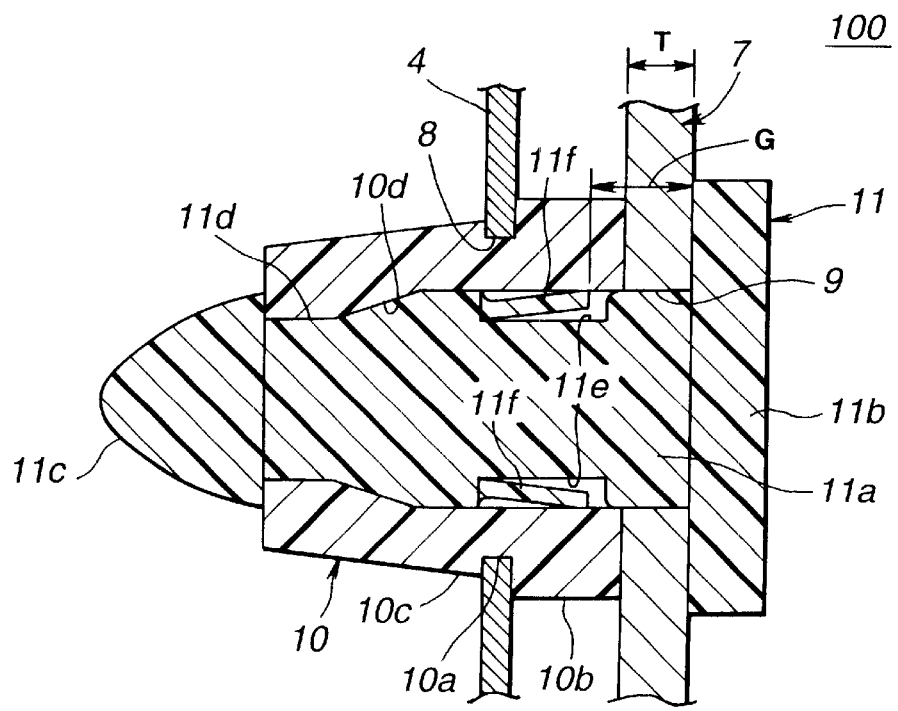
FIG. 4 is an enlarged sectional view of the essential portion.

As is seen from FIG. 4, the distance "G" between the free end of each tongue 11f and the enlarged flange portion 11b is somewhat greater than the thickness "T" of the pivot lever 7.

As will become apparent from the following, in this first embodiment 100, the shaft member 11 can be temporarily fitted to the pivot lever 7 before the pivot lever 7 is fitted to the inner panel 4.

That is, for mounting the lever pivoting structure 100 to the inner panel 4, the following assembling process is employed.

Figure 1:
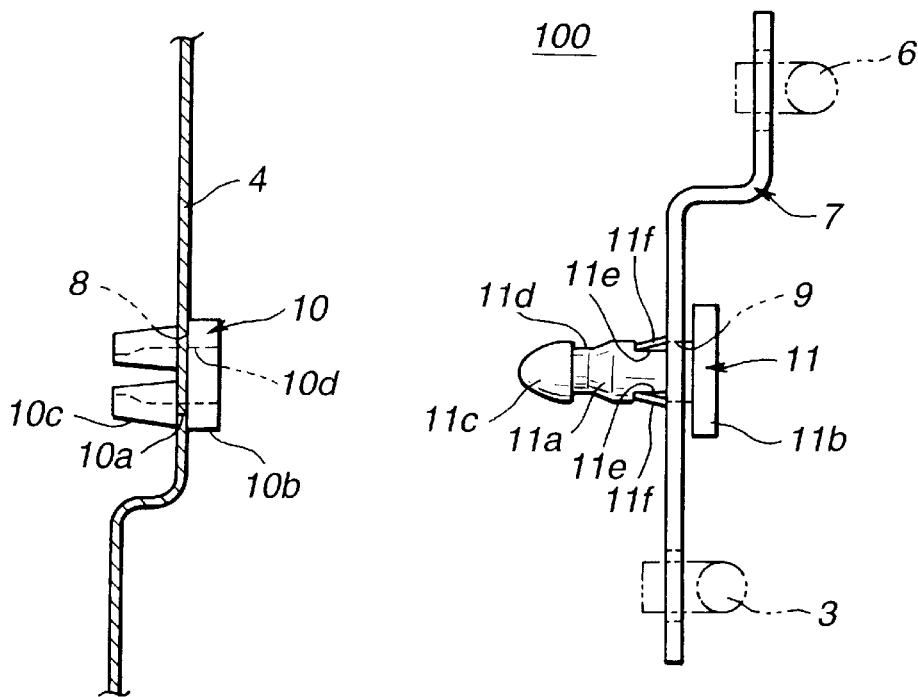
FIG. 1 is a sectional view of a lever pivoting structure of a first embodiment of the present invention in an unassembled condition.

First, as is seen from FIG. 1, the grommet 10 is properly put in the circular opening 8 of the inner panel 4.

Then, by using both hands of the assembly, the shaft member 11 is pushed 11c into the opening 9 of the pivot lever 7 from the tapered head portion 11c and drawn into a deeper position where the enlarged flange portion 11b of the shaft member 11 abuts against the pivot lever 7. During the axial movement of the shaft member 11 in the opening 9, the tongues 11f and 11f are kept pressed downward by the periphery of the opening 9. While, once the shaft member 11 comes to the deeper position, the two tongues 11f and 11f disengage from the periphery of the opening 9 and expand radially outward due to a stored expanding force thereof, so that the free ends of the tongues 11f and 11f abut against a rear surface of the pivot lever 7, as is shown in FIG. 1. Under this condition, the shaft member 11 is latched to the pivot lever 7, that is, a temporary unit including the pivot lever 7 and the shaft member 11 is provided, which can be handled by one hand of an assembler.

Figure 2:
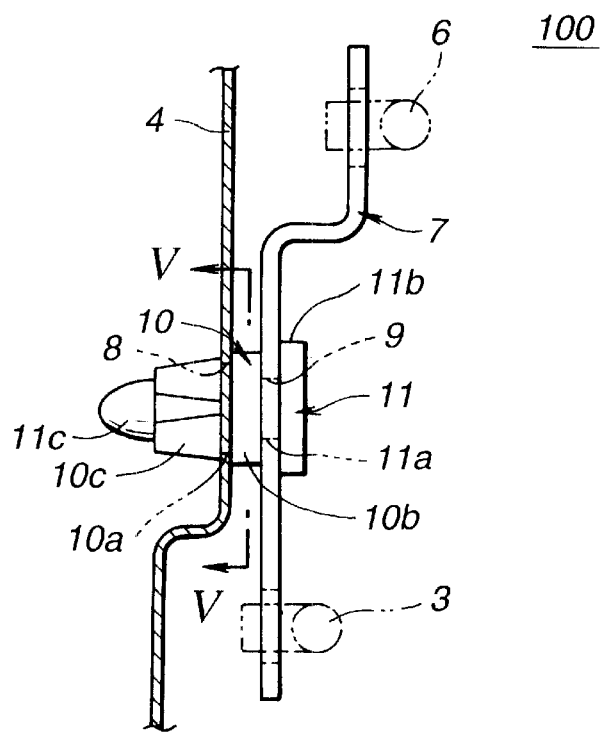
FIG. 2 is a sectional view of the lever pivoting structure of the first embodiment in an assembled condition.
Figure 3:
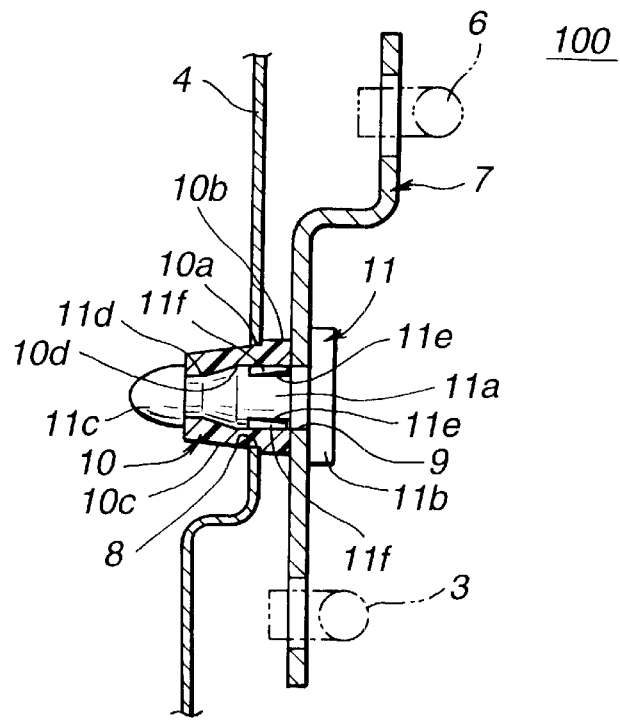
FIG. 3 is a view similar to FIG. 2, but showing the detail of an essential portion of the lever pivoting structure.

Then, the temporary unit is brought to the grommet 10 of the inner panel 4 having the tapered head portion 11c of the shaft member 11 put against the axial bore 10d of the grommet 10, and then, the shaft member 11 is strongly pushed into the axial bore hod of the grommet 10, so that the head portion 11c thereof is slipped in the axial bore 10d and projected outward (viz., leftward in FIG. 2) from the split tapered portion 10c of the grommet 10. With these steps, the lever pivoting structure 100 is properly assembled on the inner panel 4 of the door, as is shown in FIGS. 2 and 3. It is to be noted that the fitting of the temporary unit to the grommet 10 can be made by using only one hand.

Figure 5:
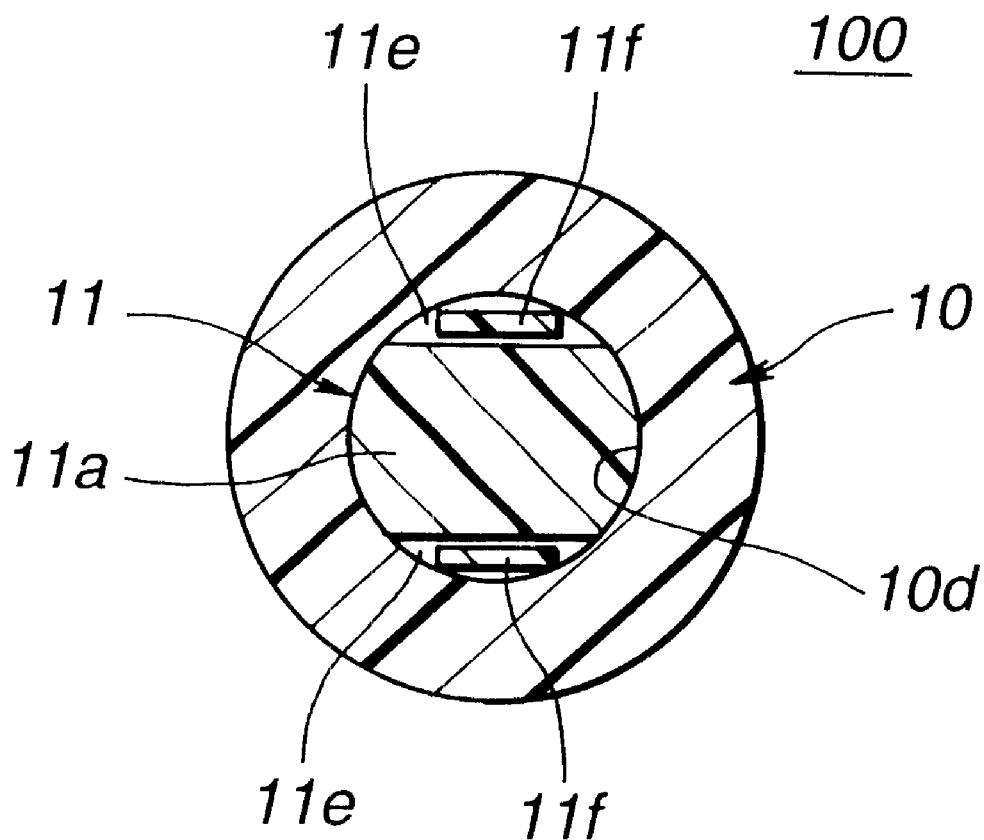
FIG. 5 is an enlarged sectional view taken along the line V—V of FIG. 2.

As is seen from FIGS. 4 and 5, once the lever pivoting structure 100 is properly assembled on the inner panel 4, the resilient tongues 11f and 11f are resiliently pressed at the free ends thereof against the inner wall of the axial bore 10d of the grommet 10. Thus, undesired play of the shaft member 11 relative to the grommet 10 is suppressed.

It is to be noted that fitting of the first and second transmission rods 3 and 6 to the pivot lever 7 may be made before or after the temporary unit is fitted to the inner panel 4.

Referring to FIGS. 6 to 10, there is shown a lever pivoting structure 200 which is a second embodiment of the present invention.

Figure 6:
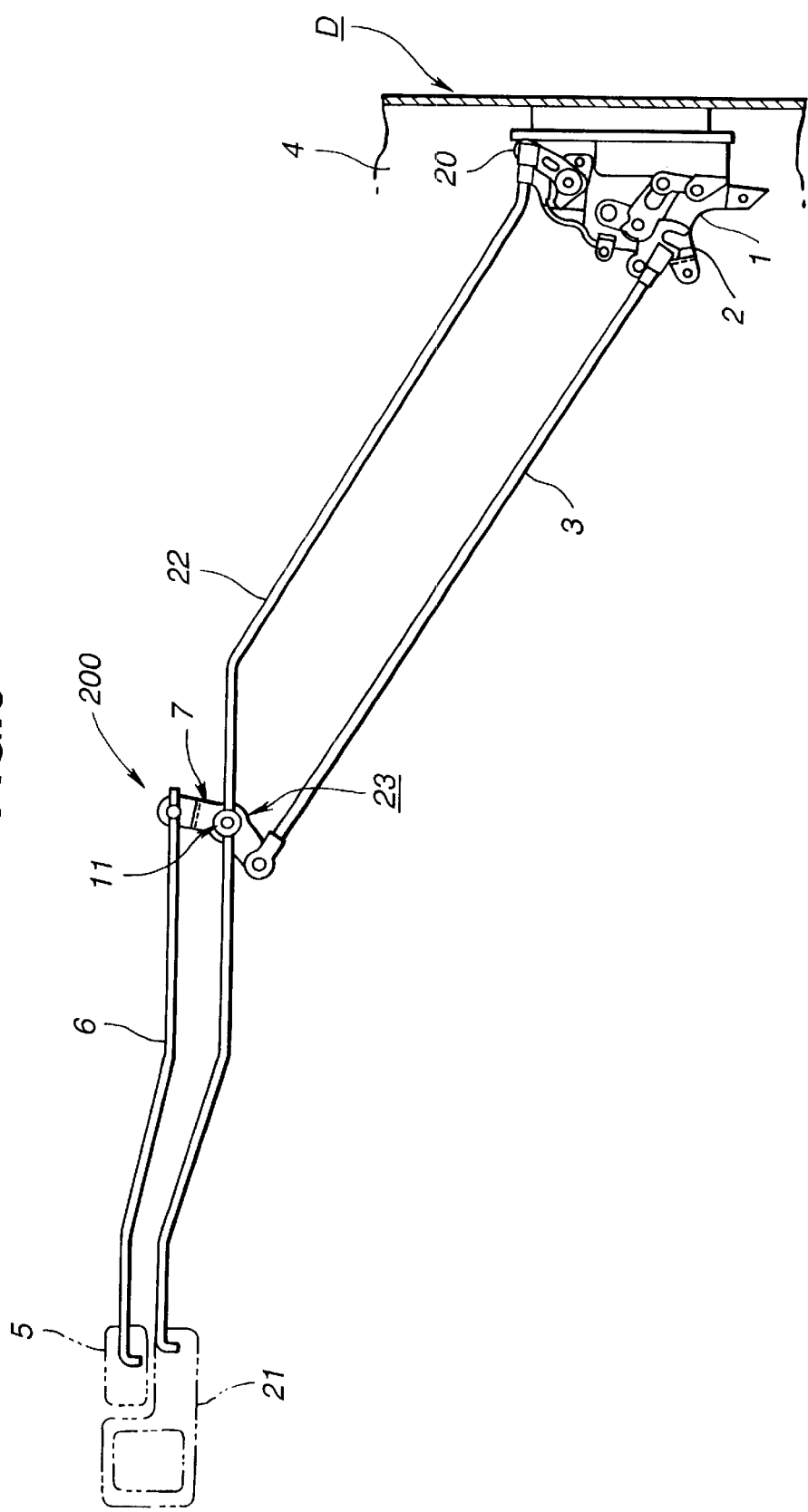
FIG. 6 is a front view of a door lock/unlock system installed in an automotive side door, to which a lever pivoting structure of a second embodiment of the present invention is practically applied.
Figure 7:
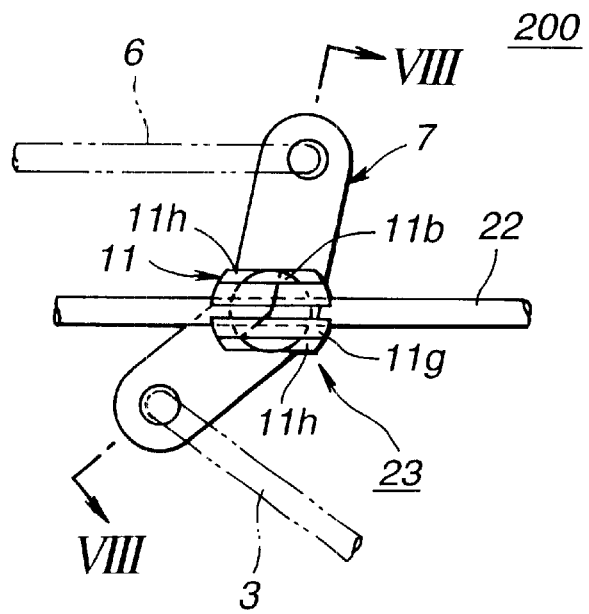
FIG. 7 is an enlarged front view of the lever pivoting structure of the second embodiment.

As is seen from FIG. 6, the lever pivoting structure 200 of this embodiment is constructed to have an additional function that is, a rod guiding means 23. As will become apparent as the description proceeds, in the second embodiment 200, a shaft, member 11 is formed with a holding portion 11g by which a third transmission rod 22 is axially movably held.

As shown in FIG. 6, the third transmission rod 22 extends from an inside handle 21 operatively mounted on the door "D" near the control knob 5 to an open lever 20 of the door lock 1 mounted on the door "D". That is, when the inside handle 21 is manipulated, the third transmission rod 22 is moved to move the open lever 20 to induce an unlocked condition of the door lock 1.

Figure 8:
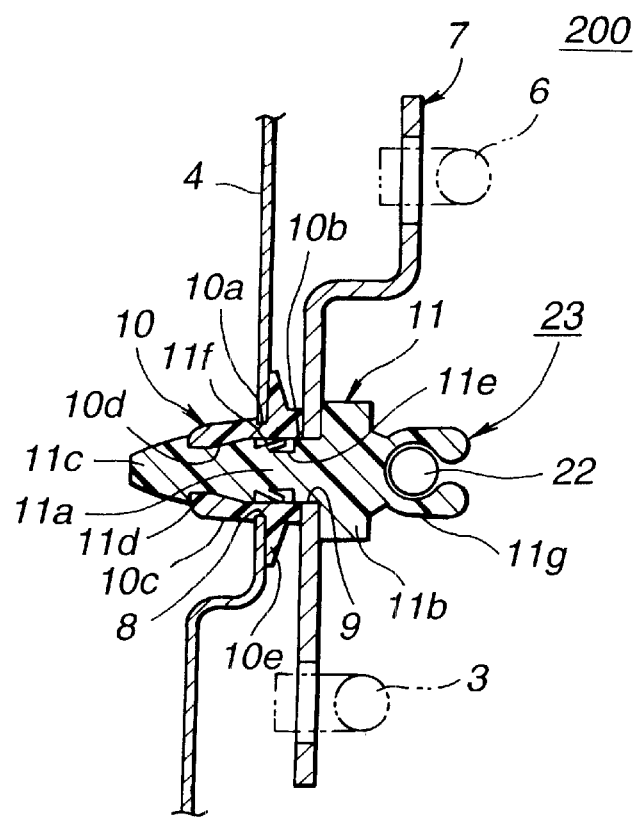
FIG. 8 is a sectional view taken along the line VIII—VIII of FIG. 7.
Figure 9:
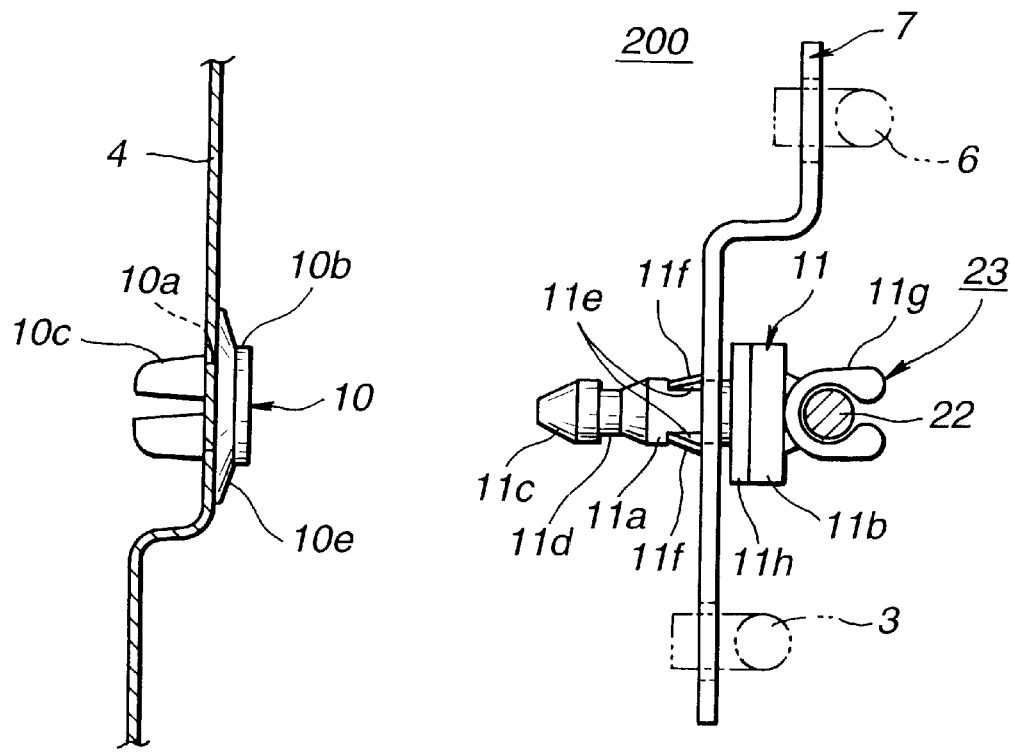
FIG. 9 is a view similar to FIG. 1, but showing the second embodiment.
Figure 10:
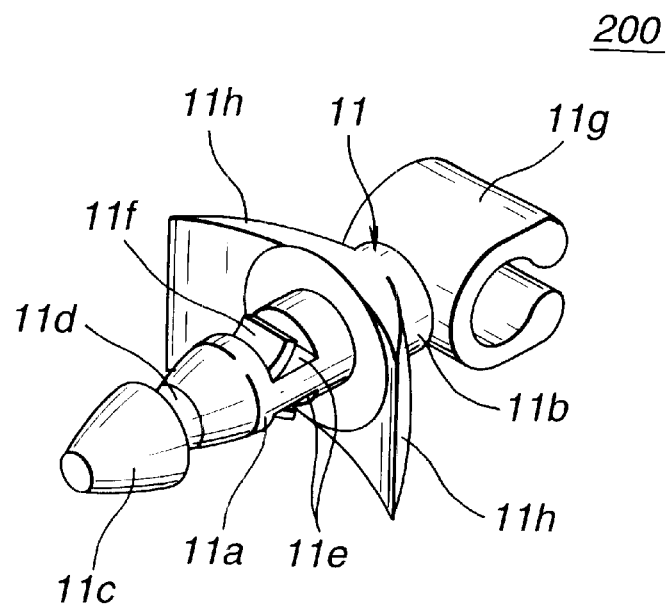
FIG. 10 is an enlarged perspective view of a shaft member employed in the second embodiment.

As is seen from FIGS. 7 to 10, particularly FIG. 10, the shaft member 11 employed in this second embodiment 200 is constructed of an elastic plastic. Similar to the shaft member 11 employed in the above-mentioned first embodiment 100, the shaft member 11 generally comprises a body portion 11a, an enlarged flange portion 11b, a tapered head portion 11c, a neck portion 11d, a pair of flat-bottomed recesses 11e and 11e and a pair of resilient stopper tongues 11f and 11f.

In the second embodiment 200, the shaft member 11 further comprises a holding portion 11g which is integrally formed on a back surface of the flange portion 11b and a pair of resilient wings 11h and 11h which are integrally formed on a front surface of the flange portion 11b. The holding portion 11g is constructed to have a generally C-shaped cross section and the resilient wings 11h and 11h are shaped to incline forward, as shown. That is, under a non-stressed condition, the resilient wings 11h and 11h incline forward.

As is seen from FIGS. 8 and 9, a grommet 10 employed in the second embodiment 200 further has a disc-shaped pressing flange 10e integrally formed around the flange portion 10b. Under a non-stressed condition, the pressing flange 10e incline forward, that is, toward the tapered portion 10c.

Similar to the first embodiment 100, in the second embodiment 200, the shaft member 11 can be temporarily fitted to the pivot lever 7 before the pivot lever 7 is fitted to the inner panel 4. Furthermore, in the second embodiment 200, the third transmitting rod 22 can be held by the shaft member 11 (namely, holding portion 11g).

That is, for mounting the lever pivoting structure 200 to the inner panel 4, the following assembling process is employed.

First, as is seen from FIG. 9, the grommet 10 is put into the circular opening 8 of the inner panel 4. With this, the disc-shaped pressing flange 10e becomes resiliently pressed against the inner panel 4, so that the grommet 10 is tightly fitted to the inner panel 4.

Then, by using both hands, the shaft member 11 is pushed into the opening 9 of the pivot lever 7 from the tapered head portion 11c and drawn into a deeper position where free ends of the two resilient wings 11h and 11h resiliently abut against a rear surface of the pivot lever 7 and free ends of the two tongues 11f and 11f abut against a front surface of the pivot lever 7, as is seen from FIG. 9. Due to provision of the two resilient wings 11h and 11h, much tight connection is achieved between the shaft member 11 and the pivot lever 7. A temporarily unit including the pivot lever 7 and the shaft member 11 is provided.

Then, the temporary unit is connected to the grommet 10 in such a way as has been described in the part of the first embodiment 100. With these steps, the lever pivoting structure 200 is assembled on the inner panel 4 of the door "D", as is seen from FIG. 8. It is to be noted that similar to the first embodiment 100, the fitting of the temporary unit to the grommet 10 can be made by using only one hand.

It is to be noted that fitting of the first, second and third transmission rods 3, 6 and 22 to the pivot lever 7 and to the holding portion 11g of the shaft member 11 may be made before or after the temporary unit is fitted to the inner panel 4.

If desired, the following modifications may be employed in the present invention.

The shaft member 11 may be directly connected to the circular opening 8 of the inner panel 4 without using the grommet 10. Preferably, in this case, the tapered head portion 11c of the shaft member 11 is provided with a plurality of latching pawls for achieving a tight engagement between the shaft member 11 and the inner panel 4.

If desired, a single tongue 11f or more than two tongues 11f may be employed for achieving the stable connection between the shaft member 11 and the pivot lever 7.

The entire contents of Japanese Patent Application P10-30090 (filed Feb. 12, 1998) are incorporated herein by reference.

Although the invention has been described above with reference to certain embodiments of the invention, the invention is not limited to the embodiments described above. Various modifications and variations of the embodiment described above will occur to those skilled in the art, in light of the above teachings.

What is claimed is:

1. A lever pivoting structure comprising:

a shaft member including a body portion having a circular cross-section, an enlarged flange portion formed on a rear end of said body portion and a stopper head portion formed on a front end of said body portion, said stopper head portion establishing a latched engagement between said stopper head portion and said first circular opening once the stopper head portion is put into the first circular opening;

a pivot lever formed with a second circular opening through which said body portion of said shaft member passes, said pivot lever having a first surface to which said enlarged flange portion faces and a second surface to which said stopper head portion faces;

at least one resilient stopper tongue integrally formed on the body portion of said shaft member, said resilient stopper tongue extending toward said enlarged flange portion while gradually separating from an axis of said shaft member, a free end of said resilient stopper tongue abutting against said second surface of said pivot lever upon engagement between said shaft member and said pivot lever; and in which said shaft member is formed at a front side of said enlarged flange portion with an inclined resilient wing, said inclined resilient wing resiliently abutting against said first surface of said pivot lever upon the latched engagement between the shaft member and said pivot lever.

2. A lever pivoting structure comprising:

a panel member having a first circular opening formed therein;

a resilient grommet put in said first circular opening to achieve a latched engagement therebetween, said grommet having an axial bore formed therethrough;

a shaft member including a body portion having a circular cross-section, an enlarged flange portion formed on a rear end of said body portion and a stopper head portion formed on a front end of said body portion, said stopper head portion establishing a latched engagement between said stopper head portion and said grommet once the stopper head portion is put into the axial bore of said grommet;

a pivot lever formed with a second circular opening through which said body portion of said shaft member passes, said pivot lever having a first surface to which said enlarged flange portion faces and a second surface to which said stopper head portion faces; and resilient stopper tongues integrally formed on the body portion of said shaft member and extending toward said enlarged flange portion while gradually separating from an axis of said shaft member, free ends of said resilient stopper tongues abutting against said second surface of said pivot lever upon engagement between said shaft member and said pivot lever; and in which said shaft member is formed at a front side of said enlarged flange portion with a pair of resilient wings which resiliently abut against said first surface of said pivot lever upon the engagement between the shaft member and said pivot lever.

\* \* \* \* \*